United States Patent
Bhate

(10) Patent No.: US 6,583,523 B1
(45) Date of Patent: Jun. 24, 2003

(54) PARALLEL DC POWER SOURCES WITH DIFFERENT CHARACTERISTICS

(75) Inventor: Suresh K. Bhate, Schenectady, NY (US)

(73) Assignee: Inverters Unlimited, Inc., Schenectady, NY (US)

( * ) Notice: Subject to any disclaimer, the term of this patent is extended or adjusted under 35 U.S.C. 154(b) by 233 days.

(21) Appl. No.: 09/635,378

(22) Filed: Aug. 9, 2000

(51) Int. Cl.$^7$ .................................................. H02J 1/00
(52) U.S. Cl. ............................ 307/86; 307/48; 320/140
(58) Field of Search ..................... 307/48, 86; 320/101, 320/140

(56) References Cited

U.S. PATENT DOCUMENTS

| | | | |
|---|---|---|---|
| 3,823,358 A | * 7/1974 | Rey ............................. | 307/66 |
| 4,770,954 A | * 9/1988 | Noordenbos ................. | 429/50 |
| 4,890,005 A | 12/1989 | Schornack | |
| 5,309,031 A | 5/1994 | Stewart et al. | |
| 5,382,893 A | 1/1995 | Dehnel | |
| 5,612,581 A | 3/1997 | Kageyama | |
| 5,659,207 A | 8/1997 | Chang | |
| 5,793,123 A | 8/1998 | Ho et al. | |
| 5,844,328 A | 12/1998 | Furst | |
| 5,939,799 A | 8/1999 | Weinstein | |
| 5,986,354 A | 11/1999 | Nagao et al. | |
| 6,232,749 B1 | * 5/2001 | Hewes et al. ............... | 320/135 |
| 6,326,097 B1 | * 12/2001 | Hockaday ................... | 427/115 |

* cited by examiner

Primary Examiner—Brian Sircus
Assistant Examiner—Sharon A. Polk
(74) Attorney, Agent, or Firm—Schmeiser, Olsen & Watts

(57) ABSTRACT

A method and structure for electric power management that economically satisfies peak power demand and immediately satisfies a sudden substantial increase in power demand. An electric power management system comprises a first circuit element in parallel with a second circuit element, and a load in parallel with the first circuit element. The first circuit element includes a first direct current (DC) energy source in series with a first diode that prevents current backflow into the first energy source. The first energy source may comprise a conventional energy source such as fossil fuel, natural gas, hydroelectric power, etc. Alternatively, the first energy source may comprise an alternative energy source such as, inter alia, fuel cells, solar cells, wind power, and biomass power. The second circuit element includes a second DC energy source in series with a second diode that prevents current backflow into the second energy source, wherein said current backflow could be high enough to damage the second energy source. The second energy source, such as a battery, can respond instantaneously to a sudden demand in power. When the open circuit voltage ($V_{20}$) of the second energy source is less than the terminal voltage ($V_1$) of the first energy source, the first energy source alone supplies power to the load. When $V_{20} \geq V_1$, the first energy source and the second energy source collectively supply power to the load. The preceding relationships between $V_{20}$ and $V_1$ hold during both steady state and transient operation of the electric power management system.

44 Claims, 8 Drawing Sheets

PARALLEL DC POWER SOURCES WITH DIFFERENT CHARACTERISTICS

BACKGROUND OF THE INVENTION

1. Technical Field

The present invention relates to a method and structure for electric power management that economically satisfies peak power demand and is able to immediately satisfy a sudden substantial increase in power demand.

2. Related Art

A power management system having an energy source may be used to supply electrical power to a facility such as a residence, a factory, a shopping center, etc. Power demand by such a facility may vary greatly with time. For example, the power demand may be very high for short periods of time, and relatively low for long periods of time. The peak power load can be several times an average power load. The energy source must be capable of satisfying the peak power demand. The fabrication costs and maintenance costs of the power management system generally increase as the system's rated peak power increases.

Additionally, some energy sources are unable to immediately satisfy a sudden substantial increase in power demand. For example, a fuel cell requires hydrogen gas for generating power. Thus a sudden increase in power demand requires a corresponding increase in available hydrogen gas. Since it is often not possible to generate hydrogen gas sufficiently rapidly to keep up with the sudden substantial increase in demand, the fuel cell voltages may fall below acceptable limits and consequently suffer damage.

There is a need for an economical method and structure for satisfying peak power demand, and also for accommodating a sudden substantial increase in power demand.

SUMMARY OF THE INVENTION

The present invention provides a power management system for supplying electric power to a load, comprising:

a first electrical circuit element that includes a first direct current (DC) energy source in series with a first rectifier that prevents current backflow into the first energy source; and a second electrical circuit element that includes a second DC energy source in series with a second rectifier that prevents current backflow into the second energy source, wherein the second electrical circuit element is in parallel with the first electrical circuit element, and wherein an open circuit voltage $V_{10}$ of the first energy source exceeds an open circuit voltage $V_{20}$ of the second energy source.

The present invention provides a method for supplying electric power to a load, comprising:

forming a first electrical circuit element that includes a first direct current (DC) energy source in series with a first rectifier that prevents current backflow into the first energy source; and forming a second electrical circuit element that includes a second DC energy source in series with a second rectifier that prevents current backflow into the second energy source, wherein the second electrical circuit element is in parallel with the first electrical circuit element, and wherein an open circuit voltage $V_{10}$ of the first energy source exceeds an open circuit voltage $V_{20}$ of the second energy source.

The present invention provides an economical method and structure for satisfying peak power demand, and also for accommodating a sudden substantial increase in power demand.

DETAILED DESCRIPTION OF THE INVENTION

Figure 1:
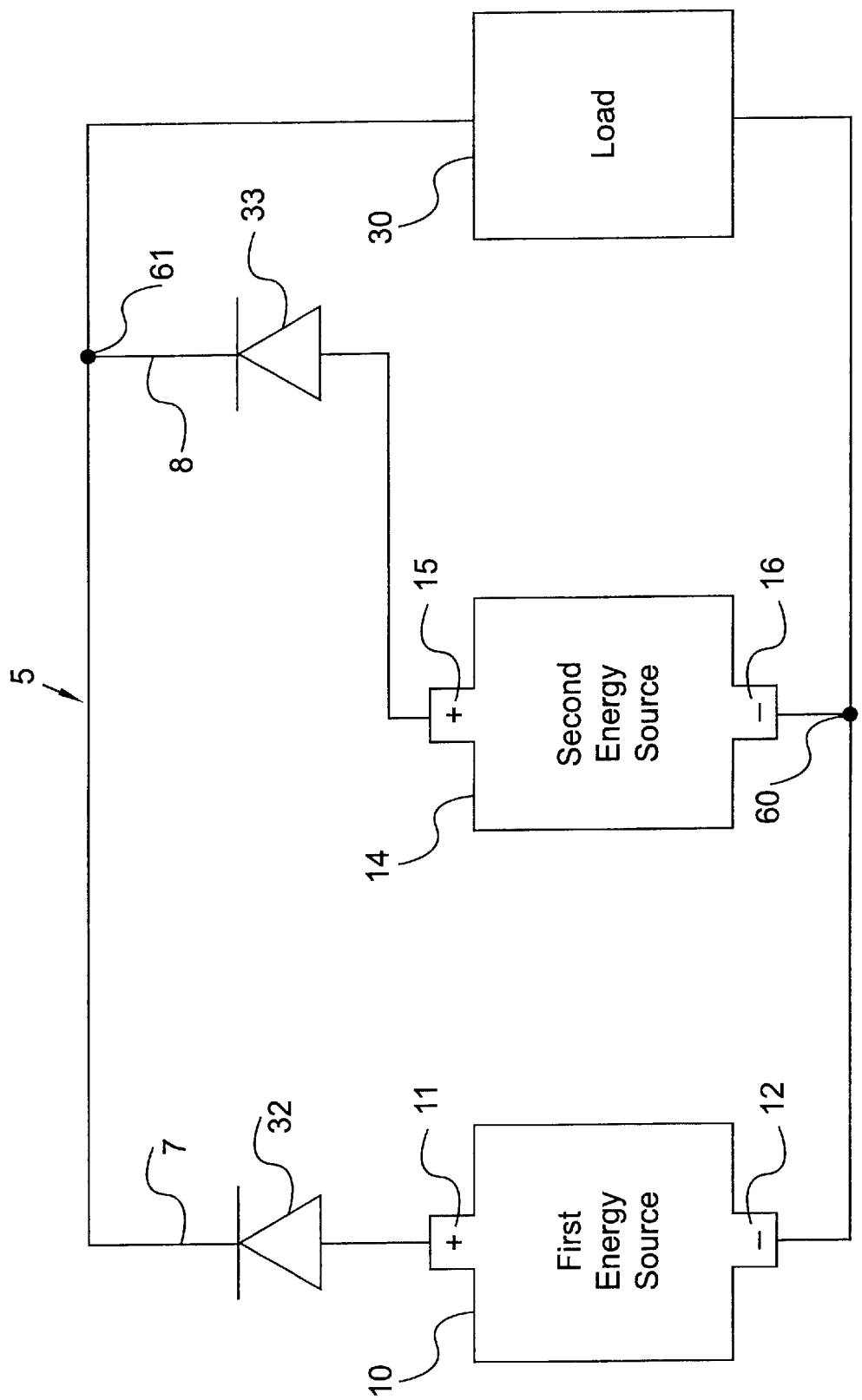
FIG. 1 depicts a schematic diagram of a power management system for supplying electric power to a load, comprising a first circuit element having a first direct current energy source and a first diode in series, in parallel with a second circuit element having a second energy source and a second diode in series, and in parallel with the load, in accordance with embodiments of the present invention.

FIG. 1 illustrates a schematic diagram of a power management system 5 for supplying electric power to a load 30, comprising a first circuit element 7 in parallel with a second circuit element 8, and the load 30 in parallel with each of the first circuit element 7 and the second circuit element 8.

The first circuit element 7 includes a first energy source 10 in series with a diode 32. The first energy source 10 is a first direct current (DC) energy source. The first energy source 10 may comprise a conventional energy source such as, inter alia, fossil fuel, natural gas, hydroelectric power, etc. Alternatively, the first energy source 10 may comprise an alternative energy source such as, inter alia, fuel cells, solar cells, wind power, and biomass power. If alternating current (AC) power is generated as a precursor to the first energy source 10, then the AC power is rectified to produce the first energy source 10 as DC power. The first circuit element 7 includes a circuit path starting at a node 60, then to the first energy source 10, and then to a node 61, as shown. An anode of the first diode 32 is conductively coupled to a positive terminal 11 of the first energy source 10. Alternatively, a cathode of the first diode 32 could have been conductively coupled to a negative terminal 12 of the first energy source 10. The positioning and orienting of the first diode 32 serves to prevent current backflow into the first energy source 10; i.e., the first diode 32 prevents electrical current from flowing into the first energy source 10 at the positive terminal 11, since such backflow of current into the first energy source 10 could damage the first energy source 10. Note that the first diode 32 could be replaced by any rectifying electronic device (i.e., any rectifier such as a silicon controlled rectifier) that prevents said backflow of current into the first energy source 10.

The second circuit element 8 includes a second energy source 14 in series with a second diode 33. It should be noted that the second energy source 14 of FIG. 1 is replaced by a battery 20 in FIGS. 2–6, discussed infra. The second energy source 14 is a second direct current (DC) energy source. The second energy source 14 may comprise any energy source capable of responding instantaneously to a sudden demand in power, such as, inter alia, a battery or a series of batteries. Any type of battery such as, inter alia, a lead-acid battery, may be used. If the first energy source 10 comprises fuel cells, an operating voltage range may include, inter alia, about 40–90 volts for the first energy source 10, and about 48–54 volts the second energy source 14. The second circuit element 8 includes a circuit path starting at the node 60, then to the second energy source 14, and then to the node 61, as shown. An anode of the second diode 33 is conductively coupled to a positive terminal 15 of the second energy source 14. Alternatively, a cathode of the second diode 33 could have been conductively coupled to a negative terminal 16 of the second energy source 14. The positioning and orienting of the second diode 33 serves to prevent current backflow into the second energy source 14; i.e., the second diode 33 prevents electrical current from flowing into the second energy source 14 at the positive terminal 15. A dangerously high backflow of current into the second energy source 14 could damage the second energy source 14. Such dangerously high backflow of current into the second energy source 14 could occur if a voltage output of the first energy source 10, after being decremented by a forward-biased voltage drop across the first diode 32, is higher than a maximum voltage across the second energy source 14. Note that the second diode 33 could be replaced by any rectifying electronic device (i.e., any rectifier such as a silicon controlled rectifier) that prevents said backflow of current into the second energy source 14.

The load 30 could be, inter alia, a DC load, or an inverter that converts DC to AC.

The following notation is used for describing how current is supplied to the load 30

$V_1$: denotes a voltage at the positive terminal 11 of the first energy source 10.

$I_1$: denotes a current at the positive terminal 11 of the first energy source 10.

$P_1$: denotes a power output from the first energy source 10.

$V_{10}$: denotes an open circuit voltage of $V_1$ (i.e., $V_1$ when $I_1$=0).

$R_1$: denotes an equivalent internal resistance of the first energy source 10.

$V_2$: denotes a voltage at the positive terminal 15 of the second energy source 14.

$I_2$: denotes a current at the positive terminal 15 of the second energy source 14.

$P_2$: denotes a power output from the second energy source 14.

$V_{20}$: denotes an open circuit voltage of $V_2$ (i.e., $V_2$ when $I_2$=0).

$R_2$: denotes an equivalent internal resistance of the second energy source 14.

$V_{D1}$: denotes a voltage across the first diode 32.

$V_{D2}$: denotes a voltage across the second diode 33.

$V_{L1}$: denotes $V_1$ minus $V_{D1}$.

$V_{L2}$: denotes $V_2$ minus $V_{D2}$.

$V_{L10}$: denotes an open-circuit value of $V_{L1}$ (i.e., $V_{L1}$ when $I_1$=0).

$V_{L20}$: denotes an open-circuit value of $V_{L2}$ (i.e., $V_{L2}$ when $I_2$=0).

$V_L$: denotes a voltage across the load 30 (also a voltage at the node 61).

$I_L$: denotes a current through load 30.

$P_L$: denotes a power delivered to the load 30.

From the preceding definitions:

$$V_{L1}=V_1-V_{D1} \tag{1}$$

$$V_{L2}=V_2-V_{D2} \tag{2}$$

$$I_L=I_1+I_2 \tag{3}$$

$$P_L=I_L V_L \tag{4}$$

Note that $V_{L1}$ is the voltage $V_1$ at the positive terminal 11 of the first energy source 10, decremented by the voltage $V_{D1}$ across the first diode 32. Similarly, $V_{L2}$ is the voltage $V_2$ at the positive terminal 15 of the second energy source 14, decremented by the voltage $V_{D2}$ across the second diode 33.

$V_1$ and $I_1$ are related by a steady-state characteristic function $V_1(I_1)$. Similarly, $V_2$ and $I_2$ are related by a steady-state function equation $V_2(I_2)$. $V_{D1}$ and $V_{D2}$ are typically of the order of about a volt and are generally small in comparison with $V_1$ and $V_2$, respectively. In principle, both $V_{D1}$ and $V_{D2}$ have steady-state characteristic functions, $V_{D1}(I_1)$ and $V_{D2}(I_2)$ respectively, which could be taken into account for computational purposes. Using the characteristic functions $V_1(I_1)$ and $V_{D1}(I_1)$, a characteristic function $V_{L1}(I_1)$ could be inferred from Equation (1). Using the characteristic functions $V_2(I_2)$ and $V_{D2}(I_2)$, a characteristic function $V_{L2}(I_2)$ could be inferred from Equation (2).

The power management system 5 is designed such that at low load power $P_L$, or equivalently low load current $I_L$, all of the load current $I_L$ is supplied by the first energy source 10, provided that the first energy source 10 is able to supply the total load current $I_L$ to the load 30. When the first energy source 10 is unable to meet load demand, then the second energy source 14 supplies to the load 30 whatever portion of $I_L$ cannot be supplied by the first energy source 10. FIGS. 6–9 illustrate the relative contributions of first energy source 10 and the second energy source 14 in supplying the load current $I_L$ to the load 30 under steady-state conditions (FIGS. 6–8) and transient conditions (FIG. 9).

Figure 6:
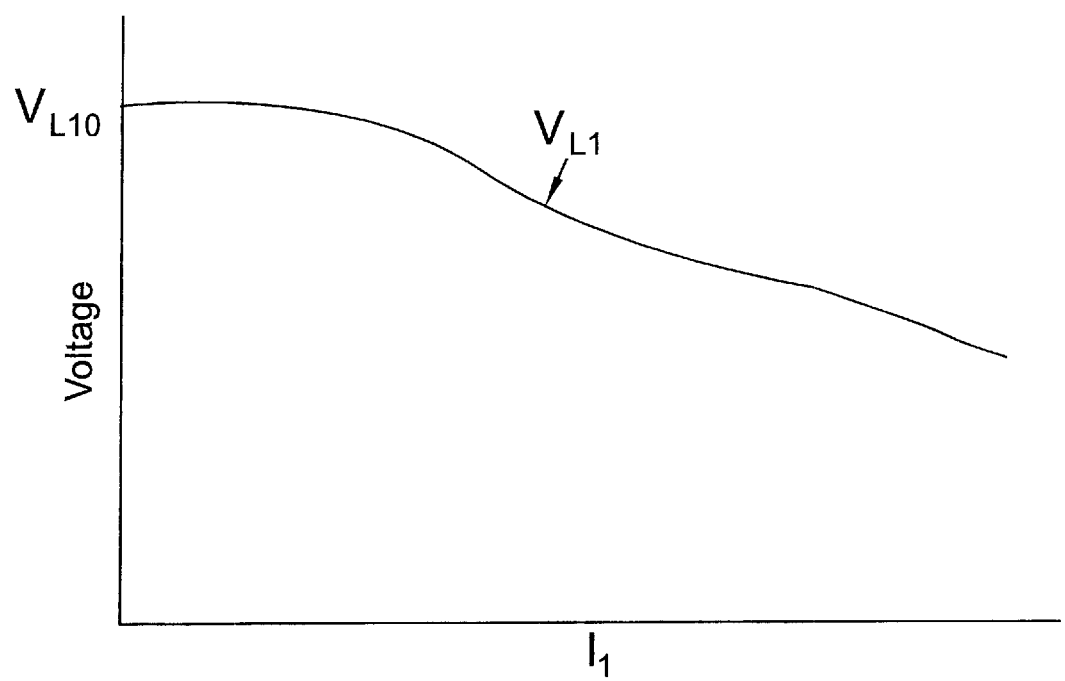
FIG. 6 depicts a steady-state voltage versus current characteristic curve of the first energy source of FIG. 1 after subtracting a voltage drop across the first diode.

FIG. 6 illustrates $V_{L1}$ versus $I_1$ under steady-state conditions. The $V_{L1}$ versus $I_1$ curve depends on the internal characteristics of the first energy source 10 and the internal characteristics of the first diode 32. Note that $V_{L1}$ and $I_1$ are in an inverse relationship. In particular $V_{L1}$ and $I_1$ are related according to:

$$V_{L1}=V_{L10}-R_1 I_1 \tag{5}$$

wherein $R_1$ is the equivalent internal resistance of the first energy source 10. Thus, the curve $V_{L1}$ versus $I_1$ is linear if $R_1$ is constant, and is non-linear if $R_1$ has a dependence on $I_1$.

Figure 7:
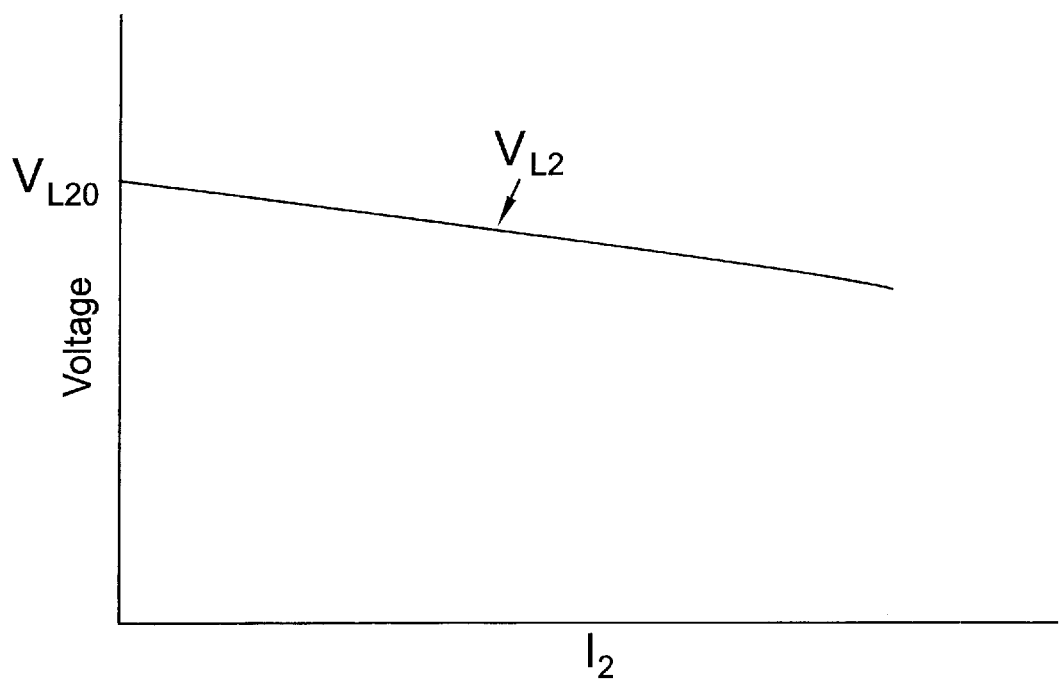
FIG. 7 depicts a steady-state voltage versus current characteristic curve of the second energy source of FIG. 1 after subtracting a voltage drop across the second diode.

FIG. 7 illustrates $V_{L2}$ versus $I_2$. The $V_{L2}$ versus $I_2$ curve depends on the internal characteristics of the second energy source 14 and the internal characteristics of the second diode 33. Note that $V_{L2}$ is nearly flat and thus not very sensitive to $I_2$, because the equivalent internal resistance $R_2$ of the second energy source 14 is assumed to be small. In particular $V_{L2}$ and $I_2$ are related according to:

$$V_{L2} = V_{L20} - R_2 I_2 \quad (6)$$

Equation (6) shows that $R_2$ is the slope of the $V_{L2}$ versus $I_2$ curve, and thus explains why $V_{L2}$ is nearly flat if $R_2$ is sufficiently small. Indeed, $V_{L2}$ approaches a constant value as $R_2$ approaches 0. Accordingly, $V_{L2}$ can maintain a voltage close to its open circuit value of $V_{L20}$ substantially independent of $I_2$, and thus substantially independent of load power $P_L$. The $V_{L2}$ versus $I_2$ curve is valid under both steady state and transient conditions, because it is assumed herein that the second energy source 14 has a capability of responding instantaneously to a sudden increase in power demand.

It is assumed that the open circuit voltage $V_{10}$ exceeds the open circuit voltage $V_{20}$, and also that the open circuit voltage $V_{L10}$ exceeds the open circuit voltage $V_{L20}$. Thus at very low load current $I_L$, $I_1 > 0$ and $I_2 = 0$. As the load current $I_L$ increases, $I_2 = 0$ will continue to be satisfied so long as $V_{L1}$ exceeds $V_{L2}$. Generally, under both steady state and transient conditions, $I_2 = 0$ if $V_{L1} > V_{L2}$. Based on $V_{L1}$ versus $I_1$ in FIG. 6, however, $V_{L1}$ decreases as $I_1$ increases. When $V_{L1}$ decreases to an extent that $V_{L1} = V_{L20}$, the current in second circuit element 8 begins to flow (i.e., $I_2 > 0$).

Figure 8:
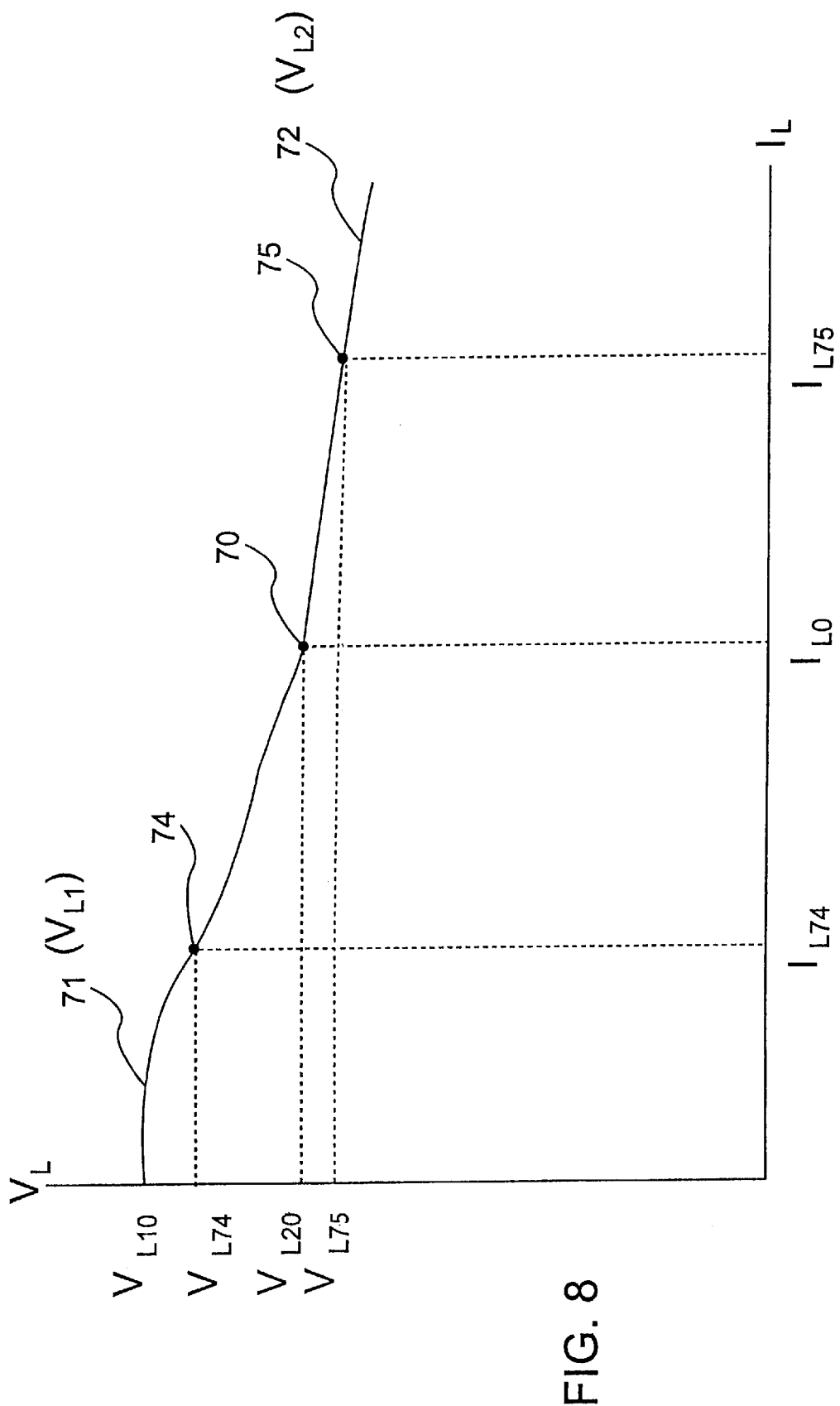
FIG. 8 depicts a steady-state load voltage drop versus load current characteristic curve for the circuit of FIG. 1, based on the characteristic curves of FIGS. 6 and 7.
Figure 9:
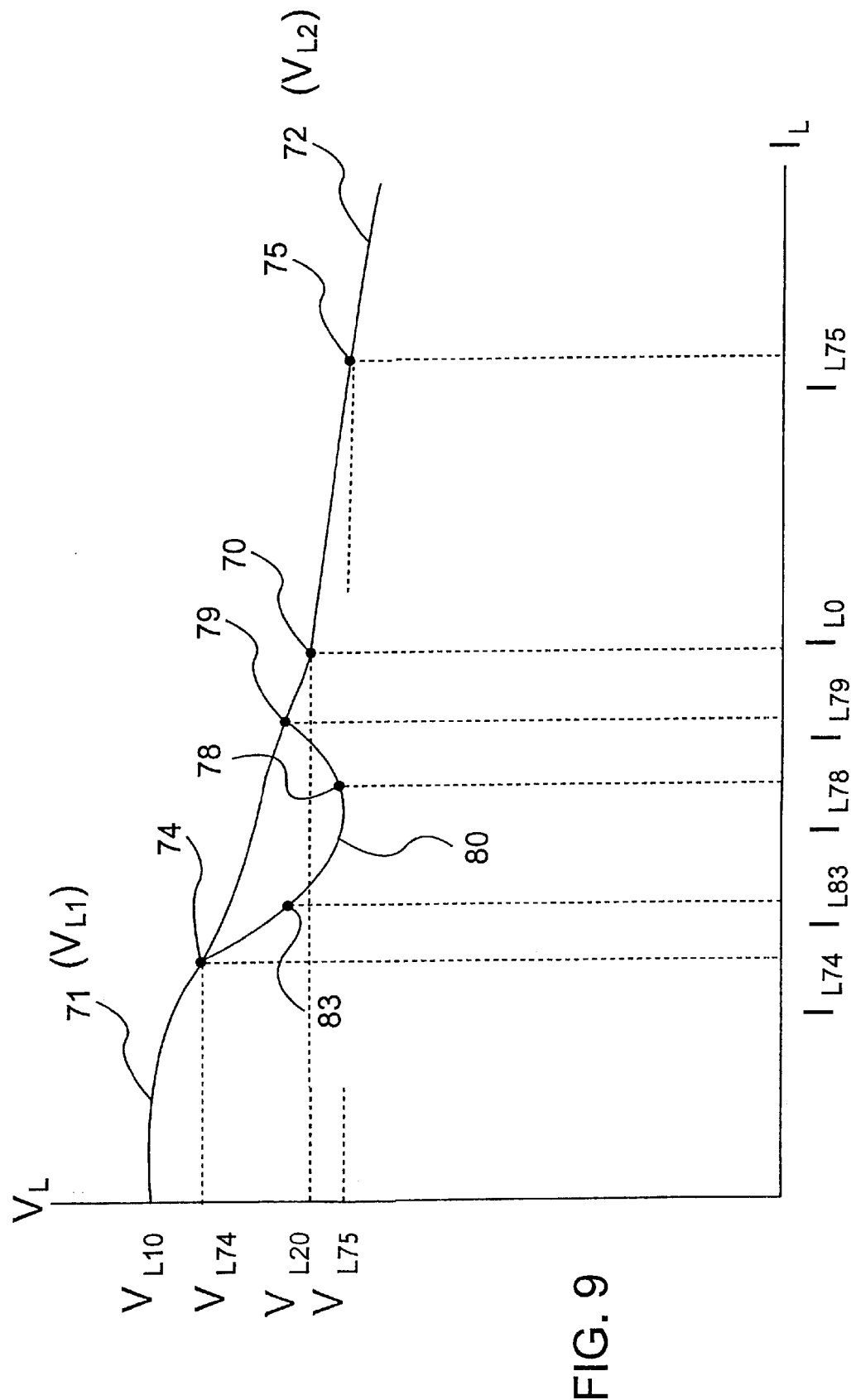
FIG. 9 depicts the steady-state load voltage drop versus load current characteristic curve of FIG. 8 with an addition of a transient operational path following an increase in load power.

FIG. 8 illustrates the load 30 voltage $V_L$ versus the load current $I_L$. The $V_L$ versus $I_L$ curve of FIG. 8 combines the $V_{L1}$ versus $I_1$ curve of FIG. 6 with the $V_{L2}$ versus $I_2$ curve of FIG. 7, using Equation (3) and assuming $V_{L10} > V_{L20}$. A transition point 70 in the $V_L$ versus $I_L$ curve is determined by the condition $V_{L1} = V_{L20}$. The curve segment 71 to the left of the point 70 is a portion of the $V_{L1}$ versus $I_1$ curve of FIG. 6 such that $V_{L1} > V_{L20}$. The load current at the point 70 is labeled as $I_{L0}$. $I_{L0}$ is determined by setting $V_{L1} = V_{L20}$ and $I_L = I_{L0}$ in Equation (5) and solving for $I_{L0}$ to obtain:

$$I_{L0} = (V_{L10} - V_{L20})/R_1 \quad (7)$$

If $P_{L0}$ denotes the load power corresponding to the point 70, then $P_{L0}$ is related to $I_{L0}$ in accordance with $P_{L0} = I_{L0} V_{L20}$. The curve segment 72 to the right of the point 70 is the $V_L$ versus I curve such that $I_1 > 0$ and $I_2 > 0$, and may be derived by setting $V_{L1} = V_L$ in Equation (5), setting $V_{L2} = V_L$ in Equation (6), and substituting Equations (5) and (6) into Equation (3) to yield:

$$V_L = I_0 + R_0 I_L \quad (8)$$

wherein $I_0 = (V_{L10}/R_1 + V_{L20}/R_2)R_0$, and wherein $R_0 = 1/(1/R_1 + 1/R_2)$. If $V_{L20} < V_{L1}$ (e.g., point 74), then the first energy source 10 supplies the load current $I_L$ (i.e., $I_{L74}$) to the load 30. If $V_{L20} \geq V_{L1}$ (e.g., point 75), then the load current $I_{L75} = I_1 + I_2$ is supplied to the load 30 by the first energy source 10 and the second energy source 14 in accordance with Equation (5) and Equation (6), respectively; i.e., $$I_1 = (V_{L10} - V_{L75})/R_1 \quad (9)$$

$$I_2 = (V_{L20} - V_{L75})/R_2 \quad (10)$$

$I_1$ may be expressed as $I_{L0} + \Delta I_1$. Accordingly, $\Delta I_1/I_2$ may be computed by subtracting $I_{L0}$ in Equation (7) from $I_1$ in Equation (9), and then dividing by $I_2$ in Equation (10) to yield:

$$\Delta I_1/I_2 = R_2/R_1 \quad (11)$$

Equation (11) shows that if $R_2 = 0$ then $\Delta I_1 = 0$, $I_1 = I_{L0}$, and $I_2 = I_{L75} - I_{L0}$. If $R_2/R_1 << 1$, which may often occur, then $\Delta I_1$ is a small, but finite, component of $I_1$.

FIG. 9 illustrates FIG. 8 for a change in power demand and explains how power demand is satisfied under both steady state and transient conditions. If the power management system 5 is initially operating at the point 74 under steady state conditions, then $V_{L20} < V_{L1}$ is satisfied and the first energy source 10 supplies the required load current $I_L$ (i.e., $I_{L74}$) to the load 30. Assume that under an increase in load power, the new steady state operating point is point 79. If the change in load power from point 74 to point 79 takes place continuously and sufficiently slowly that the first energy source 10 is able to continuously keep up with (i.e., supply energy, or supply the fuel that generates the energy) the increase in power demand, then the transition from point 74 to point 79 proceeds along the curve segment 71, and during the entire transition, $V_{L20} < V_{L1}$ is satisfied such that all of the required load current $I_L$ is continuously supplied by the first energy source 10.

Alternatively in FIG. 9, if the change in load power from point 74 to point 79 takes place abruptly or rapidly such that the first energy source 10 is unable to keep up with the increase in power demand, then the transition from point 74 to point 79 does not proceed along the curve segment 71 but instead proceeds along a path that is below the curve segment 71, such as the path 80. If a portion of the path 80 is below the $V_{L20}$ level as shown, then at each point on the path 80 that is at or below the $V_{L20}$ level, the second energy source 14 will supply part of the load current $I_L$ to the load 30 such that the first energy source 10 and the second energy source 14 collectively supply the required load current. For example, the point 78 on the path 80 is below the $V_{L20}$ level. Thus at the point 78, the first energy source 10 supplies the load current $I_{L78}$ to the load 30, and the second energy source 14 supplies the load current $(I_{L79} - I_{L78})$ to the load 30. As a result, the total load current supplied to the load 30 is $I_{L79}$ (i.e., $I_{L78 + (IL79-IL78)}$). Thus the first energy source 10 supplies a fraction F of the required load current $I_{L79}$ wherein $F = I_{L78}/I_{L79}$. The second energy source 14 supplies a fraction (1-F) of the required load current $I_{L79}$. Note that at each point on path 80 above the $V_{L20}$ level, load current is supplied only by the first energy source 10, and the first energy source 10 does not supply all of the required load current $I_{L79}$ to the load 30, since the first energy source 10 is unable to keep up with the increase in power demand. For example, the point 83 on path 80 is above the $V_{L20}$ level. Thus, the second energy source 14 does not supply any current to the load 30 at the point 83. Accordingly, the first energy source 10 supplies a current $I_{L83}$ to the load 30, wherein $I_{L83}$ is less than the required load current $I_{L79}$. In practice, operation on path 80 at the point 83 above the $V_{L20}$ level is over a time span that represents a lag time for triggering current production by the second energy source 14 when $V_{L1}$ on path 80 is lowered to below the $V_{L20}$ level.

In summary, if $V_{L20} < V_{L1}$ is satisfied, then all of the required load current $I_L$ is supplied by the first energy source 10, in both steady state and transient operational modes. Additionally if $V_{L20} \geq V_{L1}$ (or $V_{L2} \geq V_{L1}$), then the first energy source 10 supplies a fraction F of the required load current $I_L$ to the load 30, and the second energy source 14 supplies a remaining fraction (1-F) of the required load current to the load 30. In steady state or during a slow transient in which the first energy source 10 is able to keep up with change in load demand, F=1 if the first energy source 10 is at an operating current level less than $I_{L0}$, and $F = I_{L0}/I_L$ if the first energy source 10 is at an operating current level less of at least $I_{L0}$. During transient operation in which the first energy source 10 is unable to keep up with change in load demand, F is calculated as discussed supra in conjunction with the points 78 and 83 of path 80.

The open circuit voltage $V_{20}$ of the second energy source 14 may be set to a value that depends on a power variable such as a first reference power level $P_{LREF}$, wherein $P_{LREF}$ is a function of a load power representation $P_L(t)$, and wherein t denotes time. Examples of how $P_{LREF}$ may be obtained from knowledge of $P_L(t)$ will be given infra. $P_L(t)$ may be in any form and therefore may be an analytical function, a tabular function, a graphical function, etc. $P_L(t)$ may be obtained in a variety of ways. For example $P_L(t)$ may include actual load power history data of the intended operating environment or a similar operating environment. As another example, $P_L(t)$ may include a projection in time based on planned energy requirements of the intended operating environment.

Once $P_{LREF}$ is specified, $V_{L20}$ and $I_{L0}$ may be determined by simultaneously solving the power equation $P_{LREF} = I_{L0}V_{L0}$ and Equation (7), such as by simultaneously solving said power equation and Equation (7) analytically, numerically, graphically, etc. Then $V_{20}$ can be calculated via $V_{20} = V_{L20} + V_{D2}$ (see Equation (2)).

Any useful criterion may be used for determining a value of $P_{LREF}$. A first useful criterion is setting $P_{LREF}$ equal to $P_{LAVE}$ wherein $P_{LAVE}$ is a time average of $P_L(t)$ subject to a weighting function $W(t)$; i.e., $$P_{LAVE} = \int W(t) P_L(t) dt / \int W(t) dt \qquad (12)$$

over a suitable time domain. If $P_L(t)$ is defined for discrete vales of time, such as in a table, then the integrations in Equation (12) are replaced by summations over the discrete values of time in a manner understood by one of ordinary skill in the art. If $P_L(t)$ is defined over a continuous time interval (e.g., $t_A \leq t \leq t_B$), then the suitable time domain for Equation (12) may be any subset of the continuous time interval (e.g., $t_C \leq t \leq t_D$ such that $t_C \geq t_A$ and $t_D \leq t_B$). If $P_L(t)$ is defined for discrete values of time (e.g., $t_1, t_2 \ldots, t_N$), then the suitable time domain for Equation (12) may be any subset of the discrete values of time (e.g., $t_J, t_{J+1}, \ldots, t_K$, wherein J is any of 1, 2, ..., and N−1, and wherein K is any of J+1, J+2, ..., N).

A choice of $W(t)$ is $W(t)=1$ which reduces $P_{LAVE}$ to an unweighted time average of $P_L(t)$. $W(t)$ may also chosen as a function of $dP_L(t)/dt$ (e.g., $W(t) = (dP_L(t)/dt)^Z$ where Z is a real positive number such as 0.5, 1, 2, etc.) in consideration of the fact that times t at which the power $P_L(t)$ changes may be more important for determining $V_{20}$ than are times at which $P_L(t)$ is invariant or changes slowly. If $W(t) = (dP_L(t)/dt)^Z$ is used, then it may be desirable to filter out noise and erratic data from $P_L(t)$ before using Equation (12), since the noise may produce non-physical values of $dP_L(t)/dt$. Additionally, $P_L(t)$ may be preprocessed to filter out preselected high peak powers if it should be decided that the second energy source 14 should always generate positive current $I_2$ during such preselected high peak powers. Such preprocess filtering would avoid an undesired bias in $P_{LAVE}$.

As another illustration of $W(t)$, in a workplace (e.g., a factory), $P_L(t)$ may be expected to have two distinct components: $P_{L1}(t)$ during working hours and $P_{L2}(t)$ outside of working hours. While $P_{L1}(t)$ and $P_{L2}(t)$ may each have a time dependence, $P_{L1}(t) >> P_{L2}(t)$ is expected and $P_{LREF}$ may be calculated by Equation (12) by setting $W(t)=1$ during working hours and $W(t)=0$ outside of working hours, in recognition of the fact that power requirements outside of working hours may be extraordinarily low and should therefore not be allowed to bias $P_{LAVE}$.

As an alternative to setting $P_{LREF}$ equal to $P_{LAVE}$, one may calculate a standard deviation $P_{LSD}$ of $P_L(t)$ subject to the weighting function $W(t)$; i.e., $$P_{LSD} = [\int W(t) \{P_L(t)\}^2 dt / \int W(t) dt]^{1/2} \qquad (13)$$

over the same suitable time domain as is used for Equation (12). If $P_L(t)$ is defined for discrete values of time, such as in a table, then the integrations in Equation (13) are replaced by a summations over the discrete values of time in a manner understood by one of ordinary skill.

Using Equations (12) and (13) for $P_{LAVE}$ and $P_{LSD}$ respectively, $P_{LREF}$ is set in accordance with the following formula:

$$P_{LREF} = P_{LAVE} + ZP_{LSD} \qquad (14)$$

wherein Z is a real number such that $Z \geq 0$. If Z is about equal to 0 then Equation (14) simplifies to $P_{LREF}$ is about equal to $P_{LAVE}$. Z affords control of a probability of $P_L$ exceeding $P_{LREF}$. For example, using cumulative normal probability distribution tables, if Z=1 then $P_L$ is expected to exceed $P_{LREF}$ about 15.9% of the time, whereas if Z=2 then $P_L$ is expected to exceed $P_{LREF}$ about 2.3% of the time, and whereas if Z=3 then $P_L$ is expected to exceed $P_{LREF}$ about 0.1% of the time.

In general, $P_{LREF}$ may be selected in any manner that exploits the known or estimated power $P_L(t)$ and does not have to be a function of $P_{LAVE}$. For example, $P_{LREF}$ may be selected as a fraction B of a peak of $P_L(t)$, wherein B may be within a range of about, inter alia, 0.5 to 1.0. The preceding examples illustrate a few of the may different ways that $P_{LREF}$ can be chosen for determining $V_{20}$ such that $V_{20}$ is a function of the load power $P_L(t)$.

The preceding discussion concerned setting $V_{20}$ to a value that depends on $P_{LREF}$, wherein $P_{LREF}$ is a function of the load power representation $P_L(t)$. Alternatively, $V_{20}$ may be set to a value that depends on a power variable $P_{1REF}$, wherein $P_{1REF}$ is a function of the power output ($P_1$) of the first energy source 10. Examples of how $P_{1REF}$ may be obtained from knowledge of $P_1$ will be given infra.

Once $P_{1REF}$ is specified, a corresponding power reference level $P_{L1REF}$ associated with $P_{L1}$ may be inferred from $P_{L1REF} = P_{1REF} - P_{D1}$. Then $V_{20}$ and $I_{L0}$ may be determined by simultaneously solving the power equation $P_{L1REF} = I_{L0}V_{L0}$ and Equation (7) which expresses $I_{L0}$, such as by simultaneously solving said power equation and Equation (7) analytically, numerically, graphically, etc. Then $V_{20}$ can be calculated via $V_{20} = V_{L20} + V_{D2}$ (see Equation (2)).

Any useful criterion may be used for selecting a value of $P_{1REF}$ and many choices for $P_{1REF}$ are possible. A permissible choice is, inter alia, $P_{1REF} = HP_{1R}$, wherein $P_{1R}$ is a rated power (or a maximum utilizable power) of the first energy source 10, and wherein H is a fraction such as, inter alia, in a range of between about 0.25 and about 1. H=1 corresponds to choosing $P_{1REF} = P_{1R}$ which sets $V_{20}$ to essentially the fuel cell voltage at the rated power of the fuel cell. H may be chosen close to 1 (e.g. 0.90<H<0.95) so as to conservatively avoid exercising the limiting capability of the first energy source 10. If efficiency $E(P_1)$ is a known function of power, then $P_{1REF}$ can be set to a value of $P_1$ that maximizes the efficiency $E(P_1)$. There are numerous methods of measuring efficiency $E(P_1)$ such as, inter alia, minimizing cost, maximizing profit, etc. If the first energy source 10 includes fuel cells and the second energy source 14 includes batteries, then it is generally more economical to have peak power loads supplied by the batteries rather than by the fuel cells. There may be constraints added as supplementary conditions to be satisfied such as, inter alia, placing an upper limit on a rate of fuel depletion for situations in which fuel availability is limited. The preceding examples illustrate a few of the may different ways that $P_{LREF}$ can be chosen for determining $V_{20}$ such that $V_{20}$ is a function of the power output ($P_1$) of the first energy source 10.

As explained supra, $V_{20}$ may be set to a value that depends on $P_{LREF}$ or $P_{1REF}$. Additionally, $V_{20}$ may be set to a value that depends on a combination of $P_{LREF}$ and $P_{1REF}$, such as, inter alia, the linear combination $\alpha P_{LREF} + \beta P_{1REF}$, wherein $\alpha$ and $\beta$ are each constant. A numerical value of $V_{20}$ is case dependent. In a fuel cell $V_{20}$ may have a value between, inter alia, 50 volts and 60 volts in some applications (e.g., in some, but not all, residential energy applications of fuel cells), but may have other voltage values in other applications.

Figure 2:
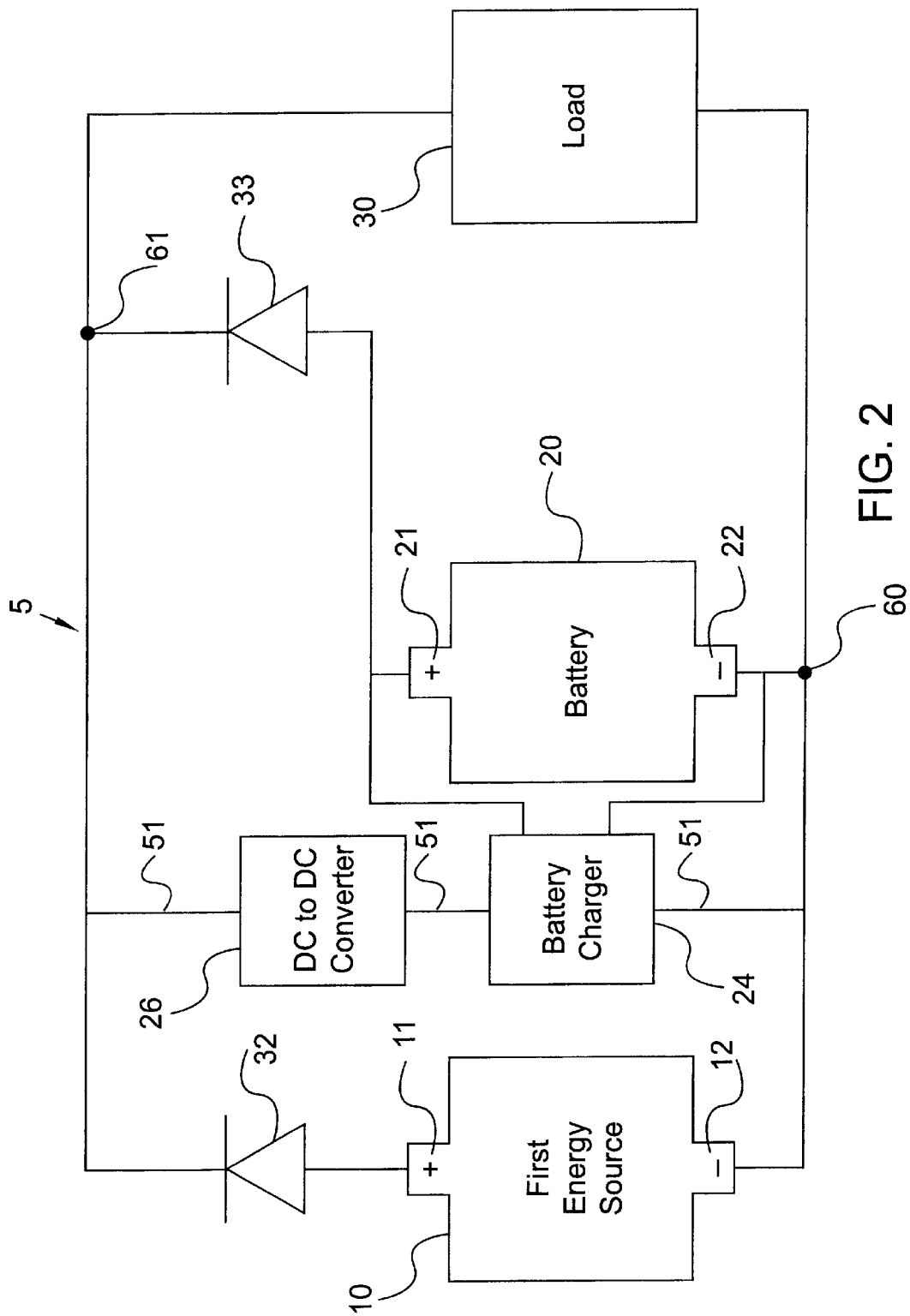
FIG. 2 depicts FIG. 1 with the second energy source being a battery, and after a battery charger has been coupled to the battery.

FIG. 2 illustrates FIG. 1 with the second energy source 14 represented as a battery 20, and after a battery charger 24 has been coupled to the battery 20 and is in parallel with the battery 20. The battery charger 24 in FIG. 2 is receiving its input power from the first energy source 10 via circuit lines 51 with a DC to DC converter 26 providing a voltage to the battery charger 24 at a voltage level that is needed to charge the battery 20. The first energy source 10 is able to provide power for charging battery 20 only at such times when first energy source 10 has available reserve power; i.e., when the load power $P_L$ is less than the rated power $P_{1R}$ of the first energy source 10 decremented by a power supplied to the first diode 32 (i.e., $P_L < P_{1R} - I_1 V_{D1}$) Alternatively, the battery charger 24 could be an independent battery charger that is not coupled to the first energy source 10, wherein the circuit lines 51 and the DC to DC converter 26 would be removed from the power management system 5 in FIG. 2.

Figure 3:
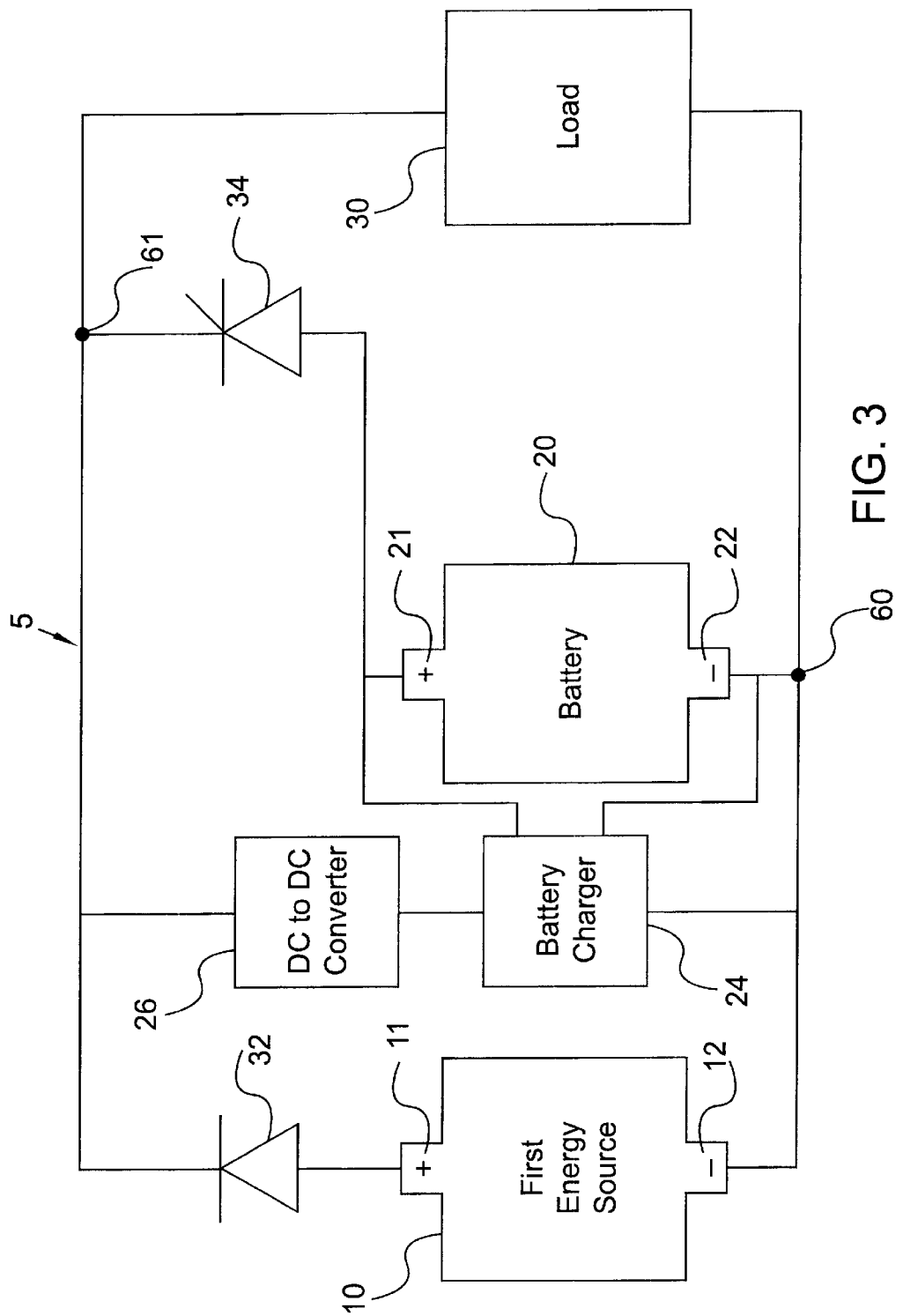
FIG. 3 depicts FIG. 2 after the second diode has been replaced by a silicon controlled rectifier.

FIG. 3 illustrates FIG. 2 after the second diode 33 has been replaced by a silicon controlled rectifier (SCR) 34. A purpose of the SCR 34 is to be able to disconnect the battery 20 when the battery charge falls below a given percentage (e.g., about 10% to about 20%) of a maximum battery charge, or equivalently, when the battery voltage $V_2$ falls below a given battery voltage (i.e., the given percentage of maximum battery charge corresponds to the given battery voltage). For example, assume that initially the battery 20 is fully charged at $V_{20}$ of 54 volts and the gate of the SCR 34 is receiving an activation signal (e.g., a positive voltage, a train of positive current pulses, etc.) from an external device (not shown), and that the battery 20 is to be disconnected at a battery voltage of 48 volts or less. When the load 30 becomes sufficiently high that $I_L \geq I_{LO}$, the SCR 34 becomes forward biased and the SCR 34 is turned on in light of the activation signal still being applied to the gate of the SCR 34. At this point, the battery 20 generates a positive current (i.e., $I_2 > 0$). As the battery 20 discharges, the battery voltage $V_2$ will be reduced in accordance with the battery discharging, and the SCR 34 will remain turned on until the SCR 34 becomes reversed biased. With the circuit configuration of FIG. 4, the SCR 34 will become reversed biased when the load 30 becomes sufficiently low that $I_L < I_{LO}$ (or equivalently, the voltage at node 61 falls below the battery voltage $V_2$ minus the SCR 34 voltage drop). Thus, a deactivation signal (e.g., a negative voltage) should be applied from the external device to the gate of the SCR when the battery voltage $V_2$ falls to 48 volts and lower, so that the SCR 34 is turned off, and remains off, when the SCR 34 becomes reversed biased. When the SCR 34 is so turned off, the battery 20 can be recharged by the battery charger 24 via a charging current from the battery charger 24 into the positive terminal 21 of the battery 20. While the battery is charging, the SCR 34 cannot be inadvertently turned on even if the load 30 is increased such that the SCR 34 becomes forward biased, because of lack of an activation signal at the gate of the SCR 34. When the battery 20 becomes maximally charged at 54 volts, an activation signal from the external device is applied to the gate of the SCR, and a full battery discharge-charge cycle has been completed.

As just described, a turning off of the SCR 34 at a given battery voltage (e.g., 48 volts) cannot be totally controlled because a reverse biasing the SCR 34 (as the battery 20 discharges) depends on the magnitude of the load 30. The SCR 34 can be turned off at the given battery voltage, however, if a bias circuit element is coupled to the anode and cathode of the SCR 34 such that the bias circuit element has voltage source of a negative polarity which is capable of reverse biasing the SCR 34. The bias circuit element could be turned on (e.,g., via a switch) to reverse bias the SCR 34 when the battery voltage falls to 48 volts, which turns off the SCR 34. In the preceding manner, the battery voltage can be kept within the 48–54 volt range. Thus, the bias circuit element and the SCR 34 collectively maintain the battery charge between a given percentage of maximum battery charge and the maximum battery charge, or equivalently, maintain the battery voltage $V_2$ between a given battery voltage and the maximum battery voltage $V_{20}$. Generally, the battery voltage may be kept within a desired range from about $V_{20} - \Delta V$ to about $V_{20}$. A useful value of $\Delta V$ may be, inter alia, between about 4 volts and about 10 volts.

Figure 4:
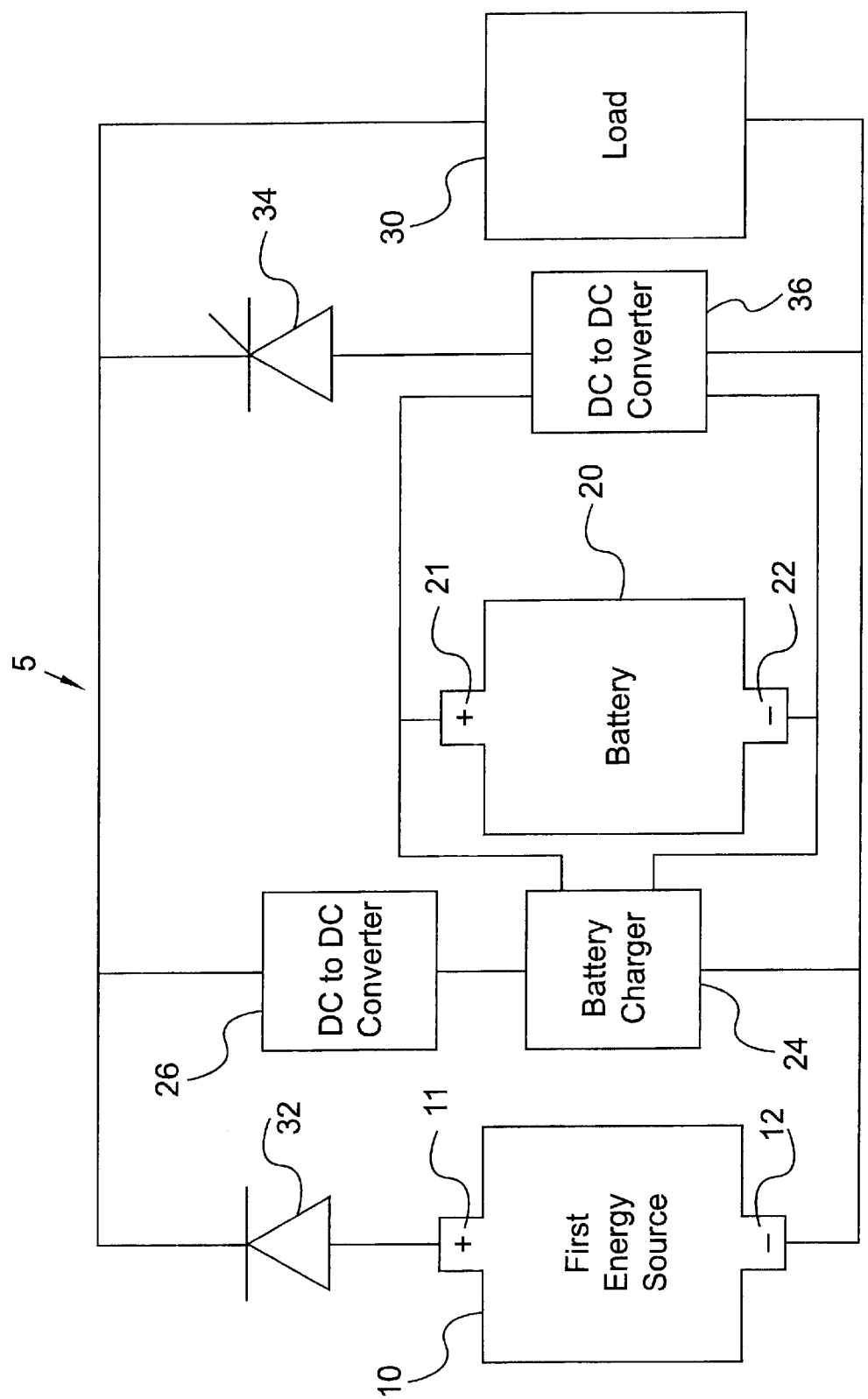
FIG. 4 depicts FIG. 3 after a DC to DC converter has been added in series with the battery.

FIG. 4 illustrates FIG. 3 after a DC to DC converter 36 has been added in series with the battery 20. An output voltage $V_{OUT}$ of the DC to DC converter 36 can be preset to a predetermined value, or dynamically controlled by a signal processor as will be illustrated infra in FIG. 5. Returning to FIG. 4, the DC to DC converter 36 may be used to limit a maximum current $I_{1MAX}$ from the first energy source 10. Referring to FIG. 8, $I_{1MAX}$ is $I_{L0}$ (corresponding to the point 70) if the DC to DC converter 36 is absent. If it is desired to lower $I_{1MAX}$ to $I_{L74}$ of FIG. 8, then $V_{OUT}$ should be set to $V_{L74}$ of FIG. 8. In that manner, the battery 20 will output current to the load 30 whenever the load voltage $V_L$ is at least $V_{L74}$, which (as shown in FIG. 8) constrains the current from the first energy source 10 to less than $I_{L74}$. In a similar fashion based on FIG. 8, $V_{OUT}$ could be lowered from above $V_{L74}$ to a value below $V_{L74}$ to increase $I_{1MAX}$ to a value greater than $I_{L74}$.

An important feature of FIG. 4 is that the DC to DC converter 36 is not in series with the first energy source 10, but in series with the battery 20. Thus the DC to DC converter 36 draws current (and thus dissipates power) only during the limited time periods during which the battery 20 is furnishing current to the load 30. Hence, power dissipation associated with current flow through the DC to DC converter 36 does not impose a significant energy penalty in comparison with an overall energy delivered to the load 30. If the DC to DC converter 36 were instead in series with the first energy source 10, then the DC to DC converter 36 would draw current at all times, since the first energy source 10 furnishes current to the load 30 at all times. Accordingly, the present invention utilizes the DC to DC converter 36 in an efficient manner that substantially reduces the power losses in DC to DC converter 36, as compared with using the DC to DC converter 36 in series with the first energy source 10. It should be noted that there is no resistive element (aside from the first diode 32) in series with the first energy source 10. Accordingly, during operation of the power management system 5 when the battery 20 is not generating the current $I_2$, there are no power losses needed to control the current from the first energy source 10, which further improves an efficiency of the power management system 5.

An additional feature of the DC to DC converter 36 relates to the fact that output voltage $V_{OUT}$ of the DC to DC converter 36, rather than the output voltage $V_2$ of the battery 20, becomes the voltage against which the output $V_{L1}$ associated with the first energy source 10 is compared for determining whether the battery 20 will output the battery current $I_2$. This additional feature enables the output voltage $V_2$ of the battery 20 to have any desired magnitude instead of being required to be less than $V_{L1}$.

Figure 5:
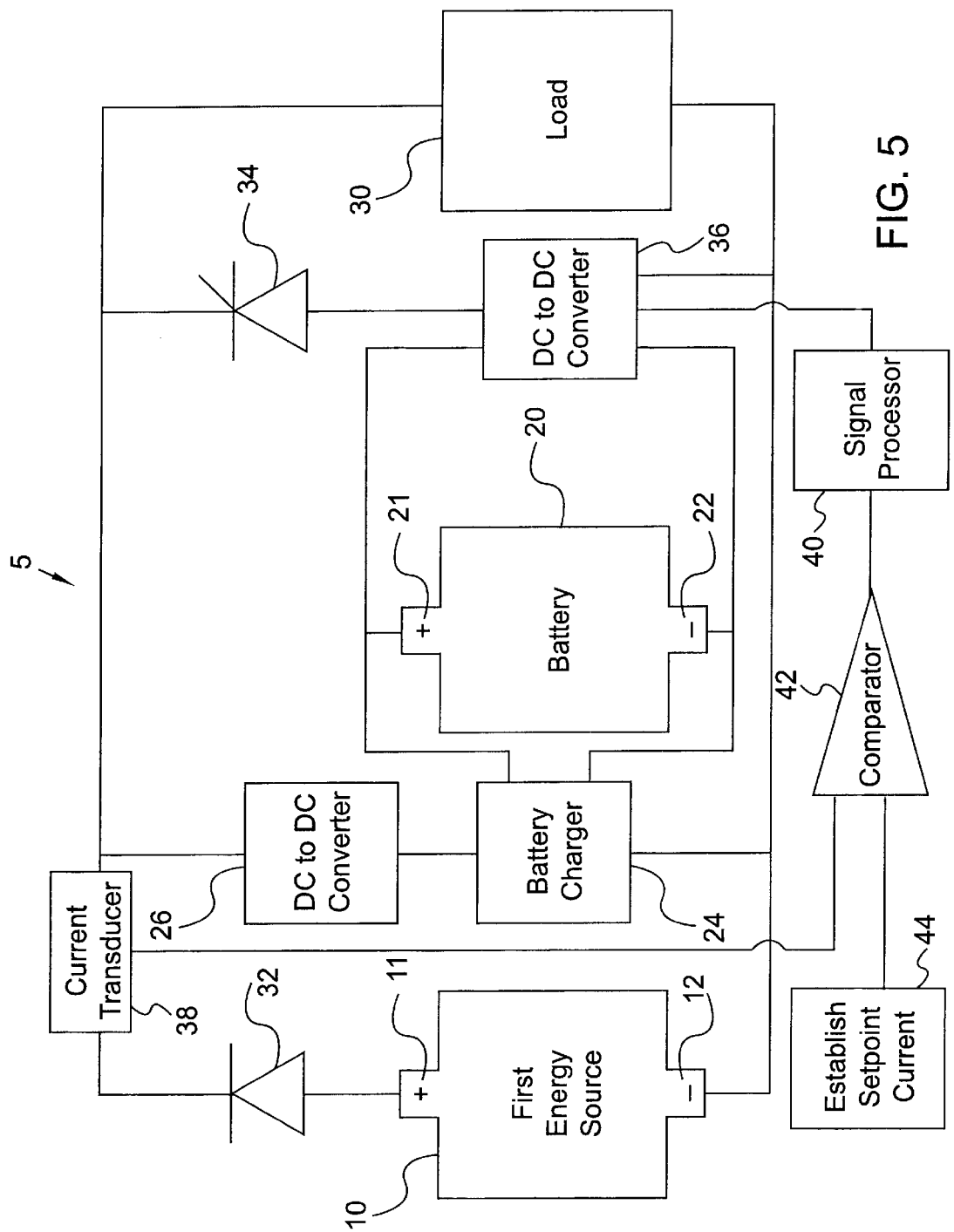
FIG. 5 depicts FIG. 4 after addition of a signal processor for transmitting a signal to the DC to DC converter to dynamically control an output current of the first energy source.

FIG. 5 illustrates FIG. 4 after addition of a signal processor 40 for transmitting a signal to the DC to DC converter to dynamically control an output current of the first energy source 10. As discussed supra in conjunction with FIG. 4, an output voltage $V_{OUT}$ of the DC to DC converter 36 can be raised to decrease the maximum current $I_{1MAX}$ from the first energy source 10, or (conversely) be lowered to increase $I_{1MAX}$. The signal processor 40 sends a signal to the DC to DC converter 36 that causes $V_{OUT}$ to be set to a particular value. The signal processor 40 may include, inter alia, hardware and software that dynamically computes $V_{OUT}$ in accordance with an algorithm that does not require input data, or in accordance with input data into the signal processor 40 wherein said data is utilized by the algorithm. The algorithm may be hardware controlled or software controlled, or both. FIG. 5 illustrates the situation in which the algorithm requires input data, by showing a particular instrumental structure that could be used to feed the input data into the signal processor 40. In particular, FIG. 5 shows a current transducer 38 which measures the current $I_1$ that flows from the first energy source 10. Let the measured value of $I_1$ be denoted as $I_{1MEAS}$. $I_{1MEAS}$ and a setpoint current $I_{SETPOINT}$ are each fed into a comparator 42 which compares $I_{1MEAS}$ with $I_{SETPOINT}$ and sends a result of the comparison to the signal processor 40. The signal processor 40 then acts upon the result of the comparison, in accordance with its algorithm, to determine a new value of $V_{OUT}$. Then the signal processor 40 sends a signal to the DC to DC converter 36 which causes $V_{OUT}$ to be set to the new value. The following two examples illustrate usage of the instrumental structure of FIG. 5. In the first example, it is desired to maintain $I_1$ at a constant value of 200 amp. If $I_{1MEAS}$ is 205 amps then $V_{OUT}$ should be raised by an amount that decreases $I_1$ to 200 amp, but if $I_{1MEAS}$ is 195 amps then $V_{OUT}$ should be lowered by an amount that increases $I_1$ to 200 amp. In the second example, it is desired to maintain $I_1$ at a maximum value of 200 amp. If $I_{1MEAS}$ exceeds 200 amps then $V_{OUT}$ should be raised by an amount that decreases $I_1$ to 200 amp, but if $I_{1MEAS}$ is less than or equal to 200 amps then $V_{OUT}$ should not be changed.

Note that the instrumental structure of FIG. 5 for dynamically supplying input data to the signal processor 40 is merely illustrative, and many other instrumental structures could be utilized for dynamically supplying input data to the signal processor 40.

It should be noted that while FIGS. 4 and 5 depicted the second energy source 14 of FIG. 1 as the battery 20, the battery 20 in FIGS. 4 and 5 could be replaced by any second energy source 14 referred to, or contemplated, in the discussion supra of FIG. 1.

It should be noted that while FIGS. 1–5 and the associated text illustrated and described the power management system 5 as having a first energy source 10 and a second energy source 14 (or the battery 20 as representing an embodiment of the second energy source 14), the system power management 5 may generally include the first energy source 10 in parallel with N secondary energy sources, wherein $N \geq 1$, wherein if $N>1$ then the N secondary energy sources are in parallel with one another, and wherein each secondary energy source is of a same type as the second energy source 14 (or the battery 20) of FIGS. 1–5. All features described herein in relation to the second energy source 14 (or the battery 20) are applicable to each secondary energy source of the N secondary energy sources.

As an example of secondary energy sources with N=2, consider a restaurant in Saratoga Springs, N.Y. in consideration of power requirements as a periodic function of time with a cycle time of one year. Here, hours during which the restaurant is closed will not be taken into account in planning a power management system, since power requirements are relatively very low when the restaurant is closed. Consider three periods of a year: a first period of September–May (lowest average power), a second period of June–July (intermediate average power), and a third period of August (highest average power). Average power for the second period will be higher than for the first period, because the second period occurs during hot weather when air conditioning is required. Average power for the third period will be higher than for the second period, because of hot weather and a substantial increase in restaurant activity due to an high influx of tourists who visit Saratoga Springs for horse racing at the Satatoga Racetrack which occurs only during the month of August. Here, a first secondary energy source could be a first battery and a second secondary energy source could be a second battery, wherein the second battery is in parallel with the first battery, and wherein the first battery is in parallel with the first energy source 10. An open-circuit voltage $V_{L20}(1)$ associated with the first battery could be set at a level such that the first battery is substantially activated (i.e., generates a current outflow) during the second period of June–July (and not during the first period except for infrequent high load power excursions) and supplements the first energy source 10. An open-circuit voltage $V_{L20}(2)$ associated with the second battery could be set at a level higher than $V_{L20}(1)$ such that the second battery is substantially activated (i.e., generates a current outflow) during the third period of August and supplements both the first energy source 10 and the first battery. The preceding example is merely illustrative. There are numerous applications for which two or more secondary energy source may be useful in the context of the present invention.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

I claim:

1. A power management system for supplying electric power to a load, comprising:

a first electrical circuit element that includes a first direct current (DC) energy source in series with a first rectifier that prevents current backflow into the first energy source; and a second electrical circuit element that includes a second DC energy source in series with a second rectifier that prevents current backflow into the second energy source, wherein the second electrical circuit element is in parallel with the first electrical circuit element, wherein an open circuit voltage $V_{10}$ of the first energy source exceeds an open circuit voltage $V_{20}$ of the second energy source, wherein $V_{20}$ is set to a value that depends on a power variable selected from tho group consisting of a first reference power level $P_{LREF}$, a second reference power level $P_{1REF}$, and a combination thereof, wherein $P_{LREF}$ is a function of a load power representation $P_L(t)$, wherein t denotes time, and wherein $P_{1REF}$ is a function of a power output of the first energy source.

2. The power management system of claim 1, wherein the power variable is $P_{LREF}$.

3. The power management system of claim 2, wherein $P_{LREF}=P_{LAVE}+Z\, P_{LSD}$, wherein $P_{LAVE}$ is a time average of $P_L(t)$ subject to a weighting function $W(t)$, wherein $P_{LSD}$ is a standard deviation of $P_L(t)$ subject to the weighting function $W(t)$, and wherein Z is a real number such that $Z \geq 0$.

4. The power management system of claim 3, wherein Z is about equal to 0.

5. The power management system of claim 1, wherein the power variable is $P_{1REF}$.

6. The power management system of claim 5, wherein the function of the power output of the first energy source is a rated power $P_{1R}$, wherein $P_{1REF}=HP_{1R}$, and wherein H is between about 0.25 and about 1.

7. The power management system of claim 6, wherein H is about equal to 1.

8. The power management system of claim 1, wherein the first energy source includes a fuel coil.

9. The power management system of claim 1, wherein the second energy source includes a battery.

10. The power management system of claim 9, further comprising a battery charger coupled to the battery for charging the battery, wherein the battery charger is in parallel with the battery and in parallel with the first energy source, and wherein the battery charger is capable of receiving a charging current from the first energy source when the first energy source is otherwise outputting a power that is less than a rated power of the first energy source.

11. The power management system of claim 1, further comprising a DC to DC converter in series with the second energy source, wherein the DC to DC converter prevents an output current of the first energy source from exceeding a maximum current, and wherein the maximum current is a function of an output voltage $V_{OUT}$ of the DC to DC converter.

12. The power management system of claim 11, further comprising a signal processor coupled to the DC to DC converter, wherein the signal processor dynamically controls $V_{OUT}$.

13. The power management system of claim 12, further comprising:
 a comparator coupled to the signal processor; and
 a current transducer coupled to the comparator, wherein the current transducer is in series with the first energy source, wherein the current transducer measures the output current of the first energy source and communicates the measured output current to the comparator, wherein the comparator generates a comparison of the measured output current with a setpoint current and communicates the comparison to the signal processor, wherein the signal processor acts upon the comparison in accordance with an algorithm and determines a new value for $V_{OUT}$, and wherein the signal processor sends a signal to the DC to DC converter which causes $V_{OUT}$ to be set to the new value.

14. The power management system of claim 1, wherein the first energy source includes a fuel cell, and wherein the second energy source includes a battery.

15. A power management system for supplying electric power to a load, comprising:
 a first electrical circuit element that includes a first direct current (DC) energy source in series with a first rectifier that prevents current backflow into the first energy source; and a second electrical circuit element that includes a second DC energy source in series with a second rectifier that prevents current backflow into the second energy source, wherein the second electrical circuit element is in parallel with the first electrical circuit element, wherein an open circuit voltage $V_{10}$ of the first energy source exceeds an open circuit voltage $V_{20}$ of the second energy source, wherein the second energy source includes a battery, and wherein the second rectifier is a silicon controlled rectifier that is utilized to maintain an output voltage of the battery between a lower voltage and a higher voltage.

16. The power management system of claim 15, wherein $V_{20}$ is between 50 volts and 60 volts, and wherein the higher voltage is about equal to $V_{20}$, and wherein the lower voltage is about 4 to 10 volts below the higher voltage.

17. The power management system of claim 15, wherein the first energy source includes a fuel cell.

18. The power management system for supplying electric power to a load, comprising:
 a first electrical circuit element that includes a first direct current (DC) energy source in series with a first rectifier that prevents current backflow into the first energy source;
 a second electrical circuit element that includes a second DC energy source in series with a second rectifier that prevents current backflow into the second energy source, wherein the second electrical circuit element is in parallel with the first electrical circuit element; and
 a DC to DC converter in series with the second energy source, wherein the DC to DC converter prevents an output current of the first energy source from exceeding a maximum current, wherein the maximum current is a function of an output voltage $V_{OUT}$ of the DC to DC converter, wherein an open circuit voltage $V_{20}$ of the second energy source is set to a value that depends on a power variable selected from the group consisting of a first reference power level $P_{1REF}$, a second reference power level $P_{1REF}$, and a combination thereof, wherein $P_{LREF}$ is a function of a load power representation $P_L(t)$, and wherein t denotes time, wherein $P_{1REF}$ is a function of a power output of the first energy source.

19. The power management system of claim 18, wherein the open circuit voltage $V_{20}$ of the second energy source exceeds an open circuit voltage $V_{10}$ of the first energy source.

20. The power management system of claim 18, wherein the first energy source includes a fuel cell.

21. The power management system of claim 18, wherein the second energy source includes a battery.

22. The power management system of claim 18, wherein the first energy source includes a fuel cell, and wherein the second energy source includes a battery.

23. A method for supplying electric power to a load, comprising:
 forming a first electrical circuit element that includes a first direct current (DC) energy source in series with a first rectifier that prevents current backflow into the first energy source; and
 forming a second electrical circuit element that includes a second DC energy source in series with a second rectifier that prevents current backflow into the second energy source, wherein the second electrical circuit element is in parallel with the first electrical circuit element, wherein an open circuit voltage $V_{10}$ of the first energy source exceeds an open circuit voltage $V_{20}$ of the second energy source, wherein $V_{20}$ is set to a value that depends on a power variable selected from the group consisting of a first reference power level $P_{LREF}$, a second reference power level $P_{1REF}$, and a combination thereof, wherein $P_{LREF}$ is a function of a load power representation $P_L(t)$, wherein t denotes time, and wherein $P_{1REF}$ is a function of a power output of the first energy source.

24. The method of claim 23, wherein the power variable is $P_{LREF}$.

25. The method of claim 24, wherein $P_{LREF}=P_{LAVE}+Z P_{LSD}$, wherein $P_{LAVE}$ is a time average of $P_L(t)$ subject to a weighting function W(t), wherein $P_{LSD}$ is a standard deviation of $P_L(t)$ subject to the weighting function W(t), and wherein Z is a real number such that $Z \geq 0$.

26. The method of claim 25, wherein Z is about equal to 0.

27. The method of claim 23, wherein the power variable is $P_{1REF}$.

28. The method of claim 27, wherein the function of the power output of the first energy source is a related power $P_{1R}$, wherein $P_{1REF}=HP_{1R}$, and wherein H is between about 0.25 and about 1.

29. The method of claim 28, wherein H is about equal to 1.

30. The method of claim 23, wherein the first energy source includes a fuel cell.

31. The method of claim 30, wherein the first energy source includes a battery.

32. The method of claim 23, wherein the second energy source includes a battery.

33. The method of claim 32, further comprising coupling a battery charger to the battery for charging the battery, wherein the battery charger is in parallel with the battery and in parallel with the first energy source, and wherein the battery charger is capable of receiving a charging current from the first energy source when the first energy source is otherwise outputting a power that is less than a rated power of the first energy source.

34. The method of claim 32, wherein the second rectifier is a silicon controlled rectifier that is utilized to maintain an output voltage of the battery between a lower voltage and a higher voltage.

35. The method of claim 34, wherein $V_{20}$ is between 50 volts and 60 volts, and wherein the higher voltage is about equal to $V_{20}$, and wherein the lower voltage is about 4 to 10 volts below the higher voltage.

36. The method of claim 23, further comprising placing a DC to DC converter in series with the second energy source, wherein the DC to DC converter prevents an output current of the first energy source from exceeding a maximum current, and wherein the maximum current is a function of an output voltage $V_{OUT}$ of the DC to DC converter.

37. The method of claim 36, further comprising coupling a signal processor to the DC to DC converter, wherein the signal processor dynamically controls $V_{OUT}$.

38. The method of claim 37, further comprising:

coupling a comparator to the signal processor; and coupling a current transducer to the comparator, wherein the current transducer is in series with the first energy source, wherein the current transducer measures the output current of the first energy source and communicates the measured output current to the comparator, wherein the comparator generates a comparison of the measured output current with a setpoint current and communicates the comparison to the signal processor, wherein the signal processor acts upon the comparison in accordance with an algorithm and determines a new value for $V_{OUT}$, and wherein the signal processor sends a signal to the DC to DC converter which causes $V_{OUT}$ to be set to the new value.

39. The method of claim 23, wherein the first energy source includes a fuel cell, and wherein the second energy source includes a battery.

40. A method for supplying electric power to a load, comprising:

forming a first electrical circuit element that includes a first direct current (DC) energy source in series with a first rectifier that prevents current backflow into the first energy source;

forming a second electrical circuit element that includes a second DC energy source in series with a second rectifier that prevents current backflow into the second energy source, wherein the second electrical circuit element is in parallel with the first electrical circuit element; and placing a DC to DC converter in series with the second energy source, wherein the DC to DC converter prevents an output current of the first energy source from exceeding a maximum current, wherein the maximum current is a function of an output voltage $V_{OUT}$ of the DC to DC converter, wherein an open circuit voltage $V_{20}$ of the second energy source is set to a value that depends on a power variable selected from the group consisting of a first reference power level $P_{LREF}$, a second reference power level $P_{1REF}$, and a combination thereof, wherein $P_{LREF}$ is a function of a load power representation $P_L(t)$, and wherein t denotes time, wherein $P_{1REF}$ is a function of a power output of the first energy source.

41. The method of claim 40, wherein the open circuit voltage $V_{20}$ of the second energy source exceeds an open circuit voltage $V_{10}$ of the first energy source.

42. The method of claim 40, wherein the first energy source includes a cell.

43. The method of claim 40, wherein the first energy source includes a battery.

44. The method of claim 40, wherein the first energy source includes a fuel cell, and wherein the second energy source includes a battery.

* * * * *

UNITED STATES PATENT AND TRADEMARK OFFICE
CERTIFICATE OF CORRECTION

PATENT NO.      : 6,583,523 B1
DATED           : June 24, 2003
INVENTOR(S)     : Bhate It is certified that error appears in the above-identified patent and that said Letters Patent is hereby corrected as shown below:

Column 13,
Line 21, delete "coil" and insert -- cell --.

Signed and Sealed this

Thirtieth Day of September, 2003

JAMES E. ROGAN
*Director of the United States Patent and Trademark Office*